Dec. 7, 1948.  G. L. PRUDHON ET AL  2,455,520
TEMPERATURE CONTROLLED TEST SYSTEM
Filed March 24, 1944  3 Sheets-Sheet 1

FIG. I

INVENTORS: G. L. PRUDHON
R. W. SPIKULA
BY
Walter M. Hill
ATTORNEY

Dec. 7, 1948.  G. L. PRUDHON ET AL  2,455,520
TEMPERATURE CONTROLLED TEST SYSTEM
Filed March 24, 1944  3 Sheets-Sheet 2

FIG. 2

INVENTORS: G. L. PRUDHON
R. W. SPIKULA
BY Walter M. Hill
ATTORNEY

Patented Dec. 7, 1948

2,455,520

UNITED STATES PATENT OFFICE 2,455,520

TEMPERATURE CONTROLLED TEST SYSTEM

Glenn L. Prudhon, Plainfield, and Russell W. Spikula, Newark, N. J., assignors to Western Electric Company, Incorporated, New York, N. Y., a corporation of New York Application March 24, 1944, Serial No. 528,012

11 Claims. (Cl. 175—183)

This invention relates to testing systems and more particularly to a control system for controlling the operation of one or more testing units in accordance with variations in the temperature of the object or device under test.

It is often necessary to test the performance of apparatus or the characteristics of materials throughout a temperature range and in many cases it is desirable that various tests be performed throughout different portions of the whole temperature range. Sometimes it is also desirable that the limits of one or more of the test circuits be changed for different temperature ranges.

It is accordingly the object of this invention to provide a means responsive to the temperature of an object or a device under test, which means is capable of controlling one or more test circuits in accordance with the temperature of the object or device under test.

It is a further object of this invention to provide a means responsive to the temperature of the object or device under test which will control the rate at which heat is applied to or removed from the object or device under test to control the rate of its change in temperature.

The foregoing objects are obtained by this invention by providing in combination, a thermally responsive circuit control means responsive to the temperature of the object or device under test, a switch means responsive to the circuit control means, circuits controlled by said switch means for progressively changing the temperature range to which said circuit control means is responsive and other circuits also controlled by said switch means for controlling test circuits.

The invention may be better understood by referring to the accompanying drawings in which Fig. 1 discloses one embodiment of this invention employing a resistance thermometer as part of the thermally responsive circuit control means.

Figure 1:
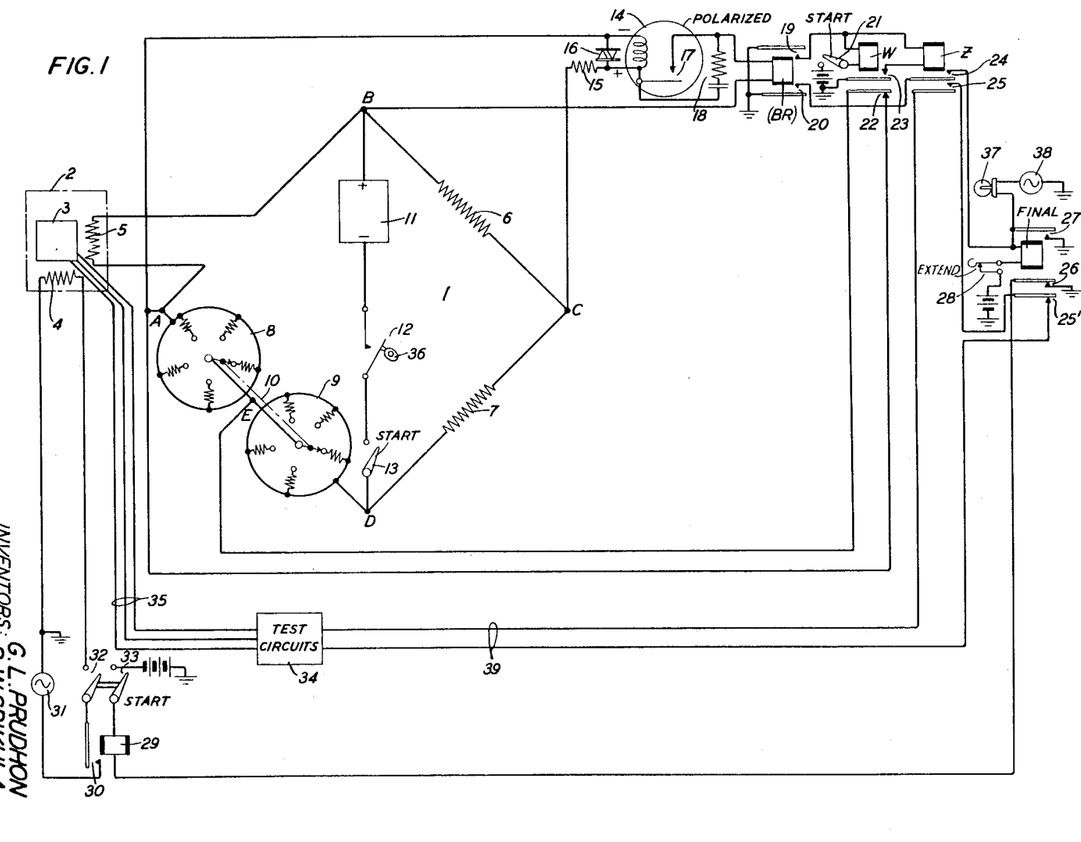

Referring now to Fig. 1, reference numeral 1 denotes generally a thermally responsive circuit control means in the form of a resistance thermometer bridge. The BC and the CD arms of this bridge contain respectively resistors 6 and 7 which are preferably of equal and fixed value, although not necessarily so. It is obvious that in the alternative these resistors 6 and 7 may have unequal values and either or both may be adjustable. In the AB arm of this bridge will be noted a resistor 5. This resistor, shown in chamber 2, is a thermally responsive resistor having either a positive or negative temperature coefficient. The characteristics of a variable resistance element such as the element 5 used in conjunction with a bridge of this type are so well known in the resistance thermometry art that a description thereof is believed to be wholly unnecessary. It need only be understood that in connection with this particular embodiment of the invention, the temperature coefficient of the resistance element 5 is assumed to have a positive value, that is to say, as the temperature increases the resistance of this element likewise increases.

It is also preferable in some applications where the object under test is relatively small in size that the thermally responsive element 5 be made to simulate the temperature change characteristic of the object. This is of particular advantage where the object is encased in an enclosure so that a thermal lag exists between the rising temperature in enclosure 2 and the actual temperature of the encased object. One obvious way of doing this is by selecting a suitable material for element 5 and simply proportioning its size and constructing its thermal radiating surface so that it will have the same thermal lag as the object or device being tested.

In the AD arm of the bridge will be found a plurality of resistors 8 and 9, different corresponding values of which may be obtained by adjusting control member 10. As will be hereinafter more particularly pointed out, the selected resistor element 8 is normally shunted out of the circuit between terminals A and E of the bridge leaving only the corresponding selected resistor element 9 between the A and D terminals of the bridge. Upon the subsequent automatic removal of this short circuit between terminals A and E, the resistor 8 is additionally connected in series with resistor 9 between the A and D terminals of the bridge. This is for the purpose of providing two different temperature limits, the use for which will be more particularly pointed out later.

Chamber 2 is preferably thermally insulated and may comprise a small chamber, a room or any other enclosure capable of being thermally insulated. Within this enclosure 2 may be placed an object, device or material 3 which is under observation and upon which tests of one kind or another are to be made. It is to be understood that the temperature within the chamber or enclosure 2 will be varied throughout a predetermined range and preferably at a predetermined rate, thereby permitting one or more tests to be performed on the object or material 3 throughout all or any predetermined part of the temperature range. For example, the chamber 2 may be of the type generally described in United States Patent 2,178,225, issued October 31, 1939, to W. F. Diehl et al. In this respect it will be understood that the atmosphere within chamber 2 may be precooled to some temperature well below normal ambient atmospheric temperature and that it may, for the start of the test cycle, gradually increase by reason of the flow of heat through the walls of the chamber 2. Simultaneously or later it may be augmented by the addition of heat by reason of a heating element 4 also included within the enclosure 2. Heater 4 may be used not only to increase the rate at which the temperature rises but may be employed to increase the temperature within the enclosure 2 well above the normal ambient atmospheric temperature thereby increasing considerably the temperature range through which the tests are made. It is obvious that preheating may be substituted for precooling in which case heaters 4 will be replaced by suitable electrically controlled refrigerating means.

Power is supplied to the bridge structure from a direct current power source 11 through a switch 13 and an intermittently operated switch 12 operated by a cam 36. Cam 36 may be driven by any suitable means as for example the motor 40 shown in Fig. 2. The output of the bridge is taken from its A and C terminals and is applied to the winding of a polarized relay 14 the movement of which may be in the form of a d'Arsonval galvanometer. To protect the relay winding from overload and also to protect the mechanism of the relay mechanically, a series resistor 15 is connected in series with the coil of the relay 14 and two oppositely directed varistors 16 are shunted across the coil to prevent the application of excessive voltages to the coil. The varistors 16 each comprise a variable non-linear resistor, the resistance of which lowers quickly upon reaching a predetermined voltage range. One familiar form of varistor is the well-known copper-oxide rectifier.

The contacts 17 of the polarized relay 14 are connected in series with the coil of relay BR which may be termed the bridge relay. Power is supplied for operating the bridge relay from the voltage drop across resistor 6 in the BC arm of the bridge network. It will therefore be seen that upon the operation of the polarized relay 14, contacts 17 will close the circuit between terminal C of the bridge network, resistor 15, contacts 17, the coil of relay BR and back to terminal B of the bridge network. Contacts 17 are protected from excessive sparking by means of a spark suppressor circuit 18 comprising a series connected resistor and capacitor.

The relay BR has associated therewith two normally open contacts 19 and 20, respectively, the armatures of each being connected to ground as shown in Fig. 1. On the closure of these contacts a circuit is completed from ground through contacts 19, the coil of relay W, switch 21 and through battery to ground. Relay W is thereby operated to close its contacts 23 and open its normally closed contacts 22. Relay W will remain operated so long as relay BR is operated and will, upon the release of relay BR, remain locked through the winding of the Z relay and its own contacts 23. It should be noted that although contacts 23 close upon the operation of relay W, relay Z can not operate by reason of a short across its coil to ground through contacts 19 of relay BR. Therefore, not until relay BR releases can relay Z operate.

Upon the operation of relay W, contacts 22 are opened thereby opening the circuit connected to terminals A and E of the bridge network. It will be observed that this removes the short across the resistor 8 thereby changing the bridge limits from that originally determined only by resistor 9 to that determined by both resistors 8 and 9 in series.

Upon the operation of relay Z as already described, the contacts 24 and 25 are closed. The closure of contacts 24 prepares a path for the subsequent operation of the final relay which operation will be more particularly described later. The closure of contacts 25 closes the circuit 39 through contacts 25' to the test circuits 34 thereby starting the test circuits in operation. The test circuits 34 are in turn connected to the object or device under test 3 through circuits 35. It should be understood that test circuits 34 may perform one or more of any of the well-known kinds of tests such as for example, measuring the temperature of the object, device or material 3; measuring the frequency response thereof as was disclosed, for example, in the Patent 2,178,225 to Diehl et al. cited above; or it may measure current, voltage or any other electrical quantity or value capable of being measured by electrical means.

It will be remembered that the W and Z relays were operated upon the first operation and release of relay BR and that, as previously indicated, the operation of relay Z partially closed a circuit through contacts 24 and the coil of the final relay. It will now be observed that should relay BR again operate, a circuit will be completed from ground through contacts 20 of relay BR, the closed contacts 24 of relay Z through the final relay coil, "extend" key 28, through battery and back to ground. Due to the fact that the coil of relay Z is temporarily short-circuited through contacts 19, 23 and ground, it acts as a slow-release relay, the principles whereof are very familiar and thoroughly understood in the telephone art. This slow-release period gives the final relay ample time to operate through the circuit just traced, its operation causing contacts 27 to close and contacts 26 and 25' to open. The closure of contacts 27 will cause an indicating lamp 37 to be energized from a source 38, thereby indicating the end of the test. The opening of contacts 26 of the final relay will open the operating circuit of relay 29 thereby causing contacts 30 to open and remove the application of electrical energy from source 31 to the heating element 4 within chamber 2. The opening of contacts 25' stops the operation of test circuits 34.

A complete cycle of operations for the above described circuit would be as follows: Start switch 13 in the bridge network 1 is first closed as are also start switch 21 in the coil circuit of relay W and the double-pole start switch near the lower left corner of Fig. 1. The closure of start switch 13 will permit power from source 11 to be applied to the bridge intermittently as cam 36 is rotated thereby intermittently closing contacts 12. Contact 12 may be operated at any suitable speed depending partly upon the frequency with which it is desired to test the temperature in enclosure 2. In some cases it is desirable to make this test every five or six seconds whereupon cam 36 may be rotated at a speed of about twelve revolutions per minute and the cam so shaped that it will maintain the closure for a period of about one second, thereby giving ample time for the operation of polarized relay 14 should the bridge become unbalanced sufficiently in the proper direction to cause its operation. The closure of switch 21 completes an obvious circuit from the underground side of battery to one terminal of the W relay coil. The operation of the double-pole switch provides battery through pole 33 to the coil of relay 29 thereby closing its contacts 30 and providing power to the heating element 4 from power source 31 through pole 32 of the double-pole switch. If the power source 31 has a grounded terminal, it is preferable that this be the upper terminal as indicated schematically in Fig. 1. This will eliminate the hazard of receiving an electric shock from the heating element 4 when the double-pole switch is open.

In addition to closing the three switches above enumerated, control 10 in the bridge network is also operated to select the proper predetermined temperature limits at which polarized relay 14 is to operate. The temperature within chamber 2 may be permitted to rise gradually from heat flow through its walls by simply leaving the double-pole switch open until the temperature thus raised reaches a desired limit, whereupon this double-pole switch may be closed. In either event the temperature within enclosure 2 is gradually rising and consequently the temperature of the object or device 3 under test is also increasing. When the temperature reaches some predetermined limit, it is desired to start the test circuits 34 in operation. This is done by having the bridge network 1 become unbalanced at this temperature to operate the polarized relay 14, thereby ultimately operating relay Z in the manner previously described which closes the circuit 39 through contacts 25. The bridge network becomes unbalanced by reason of the increasing resistance of element 5. When this element reaches a predetermined resistance limit depending upon the temperature within the enclosure 2, relay 14 will operate upon the next momentary closure of contacts 12. It will be remembered that when contacts 12 close, power is momentarily supplied to the bridge network from source 11. As previously described, contacts 17 of the polarized relay will cause the relay BR to operate which in turn will operate and lock up relay W. When momentary contacts 12 reopen, a second or so later, energy is removed from the bridge network and consequently polarized relay 14 will release, thereby opening its contacts 17. This will in turn release bridge relay BR and permit the energization of relay Z. The consequent closure of contacts 25 will close the circuits 39, thereby starting the operation of test circuits 34. Tests on the object or device 3 are thereby begun over circuits 35.

It should be noted that upon the operation of relay W, contacts 22 are opened thereby removing the short from across resistor element 8 in the bridge network 1. This increases the resistance across the AD arm of the bridge by a predetermined amount so that upon the subsequent momentary closure of contacts 12 polarized relay 14 will not operate. The tests will continue throughout a predetermined temperature range, which range is limited by the temperature reaching a value where resistor 5 will again unbalance the bridge network so that upon the momentary closing of contact 12 polarized relay 14 will again be operated. As previously described when this polarized relay 14 operates the second time, thereby energizing for the second time bridge relay BR, a circuit is completed from ground through contact 20 of bridge relay BR, through closed contacts 24 of relay Z, through the winding of the final relay and through battery to ground. This operates the final relay which in turn opens its contacts 26 thus deenergizing relay 29 which removes the application of heat to heater element 4 by reason of the opening of contacts 30, and opens contacts 25' which stops test circuits 34. At the same time that contacts 26 and 25' of the final relay are opened, contacts 27 of this relay close thereby lighting lamp 37 to indicate the end of the test.

Should the operator desire to extend the test to some higher temperature value, he may manually operate the "extend" key 28 which deenergizes the final relay thereby reclosing contacts 26 and 25'. This results in the reclosure of contacts 30 of relay 29 and the reapplication of heat to the heating element 4. The temperature within the enclosure 2 will thereupon continue to increase to the desired new limits while the test circuits resume operation because of the reclosure of contacts 25'.

It will be noted that after the closure of the various switches, the above-described control circuit will automatically start the operation of test circuits 34 at a predetermined low temperature limit and maintain the operation until some predetermined higher temperature limit is reached whereupon the tests are automatically terminated, the heat source which increases the temperature is automatically removed and a signal indicates the end of the test.

Figure 2:
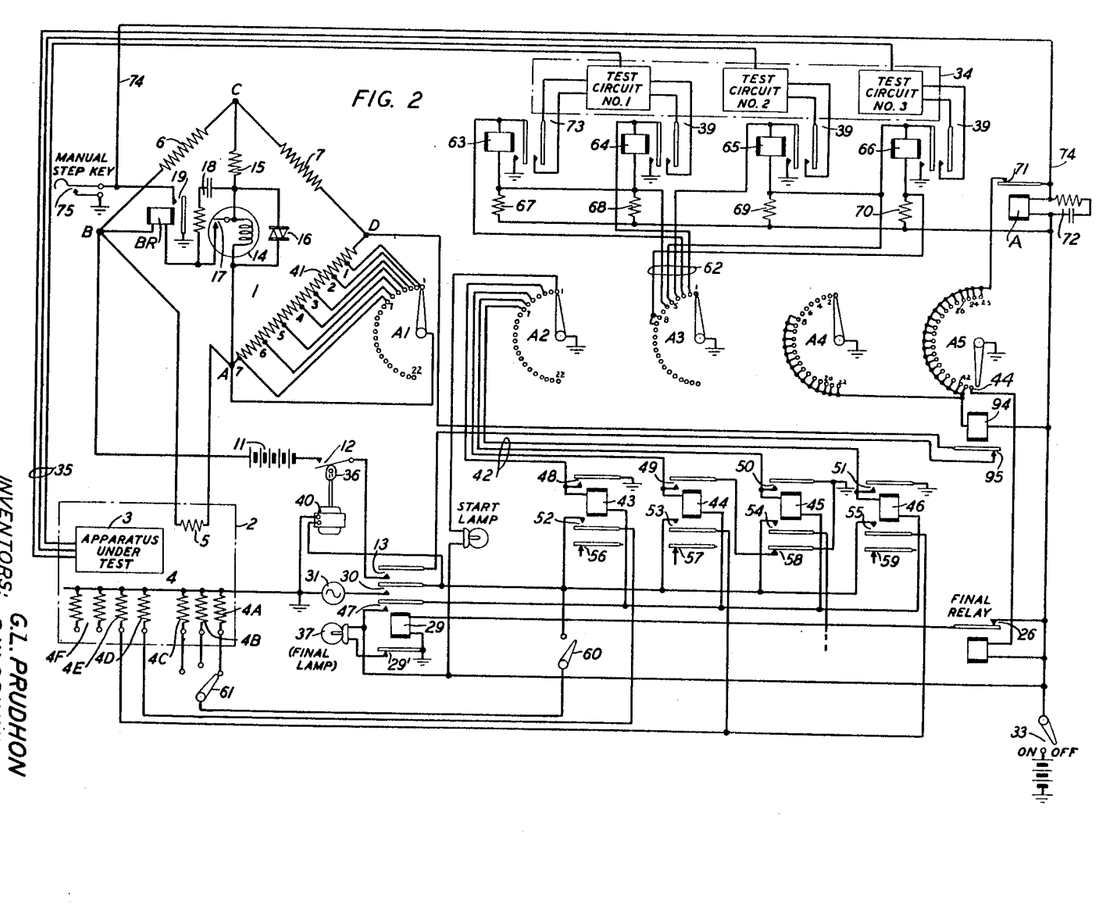
Fig. 2 shows in greater detail how a thermally responsive circuit control means in the form of a resistance thermometer may be employed to control a plurality of test circuits and to simultaneously and automatically control the rate at which the temperature of the apparatus or device under test is raised.

In Fig. 2 many of the general principles illustrated in Fig. 1 are embodied in a slightly different and more elaborate form. In his figure the control of the test circuits is entirely automatic and auxiliary heat is automatically applied within the test chamber 2 within predetermined temperature ranges. A plurality of test circuits 34 are shown which test circuits may be thrown in and out of operation within predetermined temperature ranges. Means is also shown for changing the test limits of these test circuits. In Figs. 1 and 2 the various circuit elements which are the same or which perform the same functions have the same reference numerals.

The bridge circuit 1 which is the thermally responsive circuit control means is substantially identical with that described for Fig. 1 with the exception, however, that the power source 11 is shown schematically as a battery, a motor 40 is shown driving the cam 36 and the two adjustable resistors 8, 9 in the AD arm of Fig. 1 have been replaced by a different form of adjustable resistor 41. In Fig. 1, the resistors 8 and 9 for any given position of control 10 provides only two temperature limits whereas in Fig. 2, the arrangement of resistor 41 is such as to provide one lower limit and six successive upper limits or seven temperature limits in all. It is obvious that more limits may be used if desired.

The heating means 4 in the enclosure 2 is here shown having a plurality of heating elements 4A, 4B, 4C, 4E and 4F, respectively. The particular sequence hereinafter described wherein the various heating elements are connected and disconnected and wherein the various test circuits are started, stopped and otherwise controlled through predetermined portions of the entire temperature range should not be regarded as restrictive, but merely illustrative of the manner in which these sequences may be caused to take place depending upon the requirements of the various tests which are to be made.

The chamber 2 has enclosed therein the apparatus under test 3, the temperature responsive resistor 5 and the heating units 4, which elements correspond with those described for Fig. 1. The apparatus under test 3 is connected through circuits 35 to a plurality of test circuits within the test circuit unit 34. In the specific disclosure of Fig. 2, three of these test circuits are shown, test circuit Nos. 1, 2 and 3, respectively. As previously stated these test circuits may either simultaneously or successively perform one or more different tests in one or more of the preselected temperature ranges provided by the temperature selector arm 41 of bridge network 1.

The various test circuits 34 each have associated therewith a relay 64, 65 or 66 which relay is adapted to close the circuit 39 to start its associated test in operation. This corresponds with the closure of circuit 39 in Fig. 1. An additional relay 63 is shown for one of these test circuits and may, of course, be supplied for each of the other test circuits if desired. Relay 63 is adapted to close a circuit 73 to change the limits within which the test circuit No. 1 is to operate. This permits test circuit No. 1 to test within one test limit range for one or more of the temperature ranges determined by the temperature range selector arm 41 of the bridge network 1 and test within different limits for one or more of the other temperature ranges. The exact manner in which this may be accomplished with respect to one particular type of test circuit will be disclosed more fully later in connection with the description of Fig. 3.

Another set of relays 43, 44, 45 and 46, respectively, are adapted to automatically control the rate at which heat is applied by heater unit 4. This is accomplished by having these relays throw into or out of circuit one or more of the heater units 4D, 4E and 4F as will be hereinafter more particularly described. Preliminary heat may be added by closing switch 60 which will cause either heater elements 4A, 4B or 4C to add heat at a rate depending upon the position of selector switch 61.

The operation of relays 63, 64, 65, 66 and 43, 44, 45 and 46 as well as the successive adjustments of the range selector resistor 41 is accomplished through a five bank selector switch A, the coil, which is shunted by a spark suppressor circuit 72, being shown near the upper right-hand corner of the figure. The five selector banks A1, A2, A3, A4 and A5 are shown in a row along the middle of the figure. Selector bank A1 controls the resistance of the AD arm of the bridge 1 thereby determining the temperature limit at which polarized relay 14 will be caused to operate. Selector switch bank A2 is adapted to control through circuits 42, the various heat control relays 43, 44, 45 and 46, respectively. Position 1 of this selector bank also will cause the start lamp to light. Selector switch bank A3 is adapted to control through circuits 62 the various relays 63, 64, 65 and 66 which control the operation of the test circuits 34. Selector switch banks A4 and A5 are adapted to automatically reset the selector switch at the conclusion of the test. In this connection it will be noted that the brushes of banks A4 and A5 are oppositely directed so that the brush of bank A4 will start making contact at position 8 and will maintain ground on all of the terminals between 8 and 22. At position 23 the brush of selector bank A5 will supply ground to this circuit and continue until reaching position 44 whereupon ground will be removed from the common circuit between the terminals of banks A4 and A5.

This is a well known resetting circuit in common use as the particular selector switch schematically disclosed herein and this circuit are well known in telephone practice. For the purpose of this specification, it may be described as a switch under the control of a single magnet A, which magnet upon energization will pull down its armature thereby opening contact 71. Upon the subsequent deenergization of magnet A, and the return of the armature, the armature will cause the advance of the selector brushes by one position. Consequently, with the ungrounded side of the battery connected to the lower terminal of coil A through switch 33, and with the selector switch on position 8, an obvious circuit will be completed through coil A from the ground, through the battery, through coil A, through contacts 71, through an obvious circuit to the brush of selector bank A4 and back to ground, thereby energizing the coil. Upon the energization of coil A, contact 71 is opened thereby breaking the energizing circuit. Upon the release of the armature, the selector switch brushes are advanced to position 9. Also upon release of the armature, the contact 71 is again closed to permit coil A to again become energized. The cycle is thus repeated rapidly until the selector switch has advanced to a point where neither the brush of bank A4 nor the brush of bank A5 is connected to the circuit to contacts 71. This will be noted to be the condition when the brush is on position 44. In this position each of the selector switch brushes A1, A2, A3 and A4 will be off one position to the right of contact 1, while the brush of bank A5 will be on position 44 which is the last (lowermost) contact which is connected to the coil of the final relay. In this position ground is removed from the circuit to contact 71 thereupon automatically stopping the automatic advance of the selector switch. It will thus be seen that all that is necessary to cause the selector switch to advance is to connect the upper terminal of the selector switch coil A to ground and then break the connection. In the circuit shown in Fig. 2 this is accomplished by two other means.

Each time the polarized relay 14 of the bridge network 1 operates it in turn operates the bridge relay BR thereby closing its contacts 19. Contacts 19 place ground on conductor 74 which is connected to the upper terminal of selector switch coil A. This energizes coil A and attracts the armature as previously described. Upon the subsequent release of the polarized relay 14 due to the opening of momentary contacts 12, bridge relay BR is also released thus opening its contacts 19 and removing the ground from conductor 74 which deenergizes the selector switch coil A thereby permitting the armature to release and advance the selector switch brushes one position.

Ground may also be supplied to conductor 74 by means of the manual step key 75 shown just to the left of bridge 1. This is used at the start of the test to advance the selector switch from position 44 to position 1 thereby energizing the start lamp through the brush of selector bank A2. The purpose of the start lamp is to indicate to the operator that the selector switch is at the proper position for the start of the test and that in this position the test will automatically proceed in accordance with the predetermined plan.

The operation of this control circuit may be still better understood by following through a complete sequence of operations. Preparatory to starting the test, the apparatus under test 3 is placed within the chamber 2 and connected to the various test circuits 35. If preliminary heat is to be applied in addition to the flow of heat through the insulated walls 2, selector switch 61 is so placed as to connect in circuit the desired heating element 4A, 4B or 4C. Switch 60 is then closed. The contents of chamber 2 are then cooled down to a temperature somewhat below the minimum of the desired temperature range. The means for cooling this chamber is not shown but it may comprise the use of mechanical refrigeration or the introduction of dry ice within the chamber 2. With the chamber thus cooled, the switch 33 is closed. It may be assumed that the selector switch is on position 44 so that upon the closure of switch 33, the final lamp 37 will operate by current from the battery through switch 33, through the lamp 37, contacts 29' of relay 29 and back to the battery through ground. The lighting of final lamp 37 indicates that the selector switch is on position 44. By operating and releasing the manual step key 75 the selector switch will advance to position 1 as previously described.

When the selector switch advances to position 1, ground is removed from terminal 44 of selector switch bank A5 thereby permitting the final relay to be deenergized thus closing its contacts 26. Upon the closure of these contacts the circuit is completed to the coil of relay 29 from battery through the switch 33, contact 26, the coil of relay 29 and back to battery through ground. The operation of this relay closes contacts 13, 30 and 47 of relay 29 and opens contacts 29' of relay 29. This extinguishes the final lamp and as previously stated the start lamp will be illuminated when the selector switch is placed on position 1 by reason of battery being applied to the start lamp through switch 33, the start lamp and back to the battery through the grounded brush of selector bank A2. Upon the closure of contacts 13, power may be supplied intermittently to the bridge through intermittent contacts 12 from battery 11. Motor 40, operating cam 36, is started by reason of the closure of contacts 30 of relay 29 thereby connecting the motor to alternating current source 31. The contacts 47 of relay 29 place battery on one terminal of each of the coils of relays 43, 44, 45 and 46 so that each of these relays will operate in the event ground is connected to the upper terminals of their coils. Also upon the closure of switch 33 battery is applied to one terminal of the coils of relays 63, 64, 65 and 66 through resistors 67, 68, 69 and 70, respectively. Consequently, if ground is applied to the upper terminal of the coils of relays 63, 64, 65 or 66, these coils will be energized.

With switch 33 closed as previously described, it will be evident that motor 40 will rotate cam 36 to intermittently open and close contacts 12 thereby intermittently supplying power to the bridge. With the selector switch in position 1 only the portion of the resistance between terminal D and point 1 on resistor 41 will be connected effectively in the arm AD, all of the rest of this resistor between points 1 and 7 being shunted out through the brush of switch bank A1. When the contacts 30 of relay 29 were closed, power was also supplied to the preliminary heating element 4A by reason of the circuit from the ungrounded side of power source 31 to contacts 30, switch 60, switch 61, heating element 4A and back to power source 31. The temperature within the chamber 2 gradually rises until a predetermined limit is reached, whereupon the resistance of the thermally responsive resistor 5 increased sufficiently to unbalance the bridge and operate polarized relay 14. This in turn operates the bridge relay BR to place ground on conductor 74 through contacts 19. As previously described, when ground is placed on conductor 74, the selector switch coil A is energized to attract its armature. As the intermittent contacts 12 are again opened so as to remove power from the bridge, the polarized relay 14 and bridge relay BR are both degenerized, thus removing the ground from conductor 74 and deenergizing the selector switch coil A. This advances the selector switch to position 2.

In position 2 it will be noted that the selector brush of bank A1 is advanced to position 2 to insert a new resistance in the AD arm of the bridge. Consequently, upon the reclosure of contacts 12, polarized relay 14 will not operate and will not again operate until the temperature in chamber 2 reaches a sufficiently high level to again unbalance the bridge in the proper direction. The advance of the selector switch to position 2 also removes ground from position 1 in switch bank A2, thereby extinguishing the start lamp. At position 2 of the selector switch bank A3, a circuit is connected through the A3 brush from ground to the upper terminal of relay coil 64, thereby causing this coil to be energized from battery through switch 33, resistor 68, coil of relay 64, through switch brush A3 to ground. As relay 64 operates, its left contact locks it operated by maintaining the ground connection on the upper coil terminal and the closure of the right-hand contacts of relay 64 completes the circuit 39 to test circuit No. 1 thereby starting this test circuit in operation. As previously explained test circuit No. 1 is connected with the apparatus under test through circuit 35. This test continues throughout the temperature range until the selector switch reaches position 6 as will be hereinafter explained.

When the temperature in chamber 2 reaches a sufficiently high level, the resistance of resistor 5 increases to the point where the polarized relay 14 and bridge relay BR are again operated, thereby again placing ground on conductor 74 and advancing the selector switch to position 3 in the same manner as previously described. At position 3 a new limit is again set up on resistor 41 in the AD arm of the bridge. Also on position 3 the brush of the A2 bank places ground on the upper coil connection of relay 43, thereby causing this relay to be operated through a circuit from battery through switch 33, contacts 47 of relay 29 to the coil of relay 43 and back to battery through the grounded brush of selector switch bank A2. When relay 43 operates, it locks by reason of contacts 48, the armature of which is grounded. Contacts 52 of this relay are closed to complete a circuit to heating element 4D, the circuit being substantially identical with that already described for heating element 4A except that the circuit is completed through contacts 52 instead of through switch 60. Contacts 56 of relay 43 are not used in this particular arrangement. In this connection it might also be stated that contacts 57 of relay 44 and 59 of relay 46 are also not used in this particular arrangement of the apparatus. They are, however, used in the same manner as contacts 58 in the event that a different sequence in applying heat to chamber 2 is desired.

It should be remembered that when the selector switch was on position 2, test circuit No. 1 was brought into operation by reason of the energization of relay 64. This test has been continuing within certain test limits inherent within the test circuit. It is assumed for the purposes of this specification that when the control selector switch reaches position 3 that it will be desirable to have the test circuit No. 1 operate between different limits which may be changed by closing the circuit 73. This is accomplished automatically by selector switch bank A3 which places ground on one of the conductors of circuit 62 to the upper coil terminal of relay 63 thereby causing this relay to operate in the same manner that relay 64 operated. Relay 63 will likewise lock operated through its left-hand contacts and its right-hand contacts will close the circuit 73 to change the test limits for test circuit No. 1. The matter of test limits will be more particularly described later in connection with Fig. 3.

When the temperature has again reached a still higher level, the bridge will again become unbalanced thus operating polarized relay 14 and bridge relay BR and again placing ground on conductor 74. This will advance the selector switch as previously described to the next position which is position 4. Selector bank A1 will set up a new temperature limit on resistor 41. Selector bank A3 will cause relay 65 to operate in the same manner previously described for relays 64 and 63. This closes the circuit 39 for test circuit No. 2, bringing this test circuit into operation. It will now be noted that both test circuits No. 1 and No. 2 are operating.

When the temperature in chamber 2 has reached another predetermined higher level, the same sequence of operation previously described will cause the selector switch to advance to the next position which is position 5. In this position selector switch bank A2 will place ground on the upper terminal of relay coil 44, thus causing relay 44 to operate. Relay 44 will lock operated through its contacts 49 and the normally closed contacts 58 of relay 45, thus making the continued operation of relay 44 contingent upon the continued release of relay 45. The operation of relay 44 will cause contacts 53 to close thus bringing heating element 4E into operation to supply additional heat to chamber 2. It is assumed that the temperature of chamber 2 has now risen above the ambient temperature and that heat is now flowing through the walls from the inside to the outside and that this additional heat from heating element 4E is required to offset this loss.

Also at position 5 of the selector switch, selector switch bank A3 places ground on its terminal 5 thus causing the relay 66 to operate and bring into operation test circuit No. 3. It will also be noted that the brush of bank A3 places ground on the upper terminal of resistor 69, thus effectively short-circuiting the coil of relay 65, causing it to release. Restating the operation, when the selector switch is brought to position 5, the bank A3 causes relay 66 to operate and relay 65 to release thereby bringing into operation test circuit No. 3 and taking out of operation test circuit No. 2.

When the temperature in chamber 2 has reached another new high level, the same sequence of operations will cause the selector switch to advance to position 6. On position 6 selector switch bank A3 causes relay 45 to operate and lock operated through its contacts 50. Normally closed contacts 58 open up the lock circuits for relay 44 thereby releasing relay 44. The release of relay 44 removes the heating element 4E from the power source 31. In this connection it should be noted that if desired contacts 54 of this relay may have its armature connected to one of the other heating elements 4F which may be caused to add additional heat at a different rate from that previously added by heating element 4E. As shown, however, in Fig. 2, contacts 54 are not connected to any of the heating elements. Also on position 6 of the selector switch, selector switch bank A3 will cause the release of both relays 63 and 64 by reason of placing ground on the upper terminals of resistors 67 and 68, thereby short-circuiting the coils of relays 63 and 64. This will take test circuit No. 1 out of operation and will restore its limits to that originally used by reason of the opening of circuit 73.

As the temperature continues to increase in chamber 2, the selector switch is again advanced to position 7 in the same manner already described. In this position it will be noted that selector switch bank A1 has placed into the AD arm of the bridge all of the resistance 41. If is is desired to break up the entire temperature range into additional portions, additional resistors may be inserted in the AD arm and connected to succeeding terminals in the same manner shown for the first seven terminals of the bank A1. At position 7 of this switch, it will be noted that selector switch bank A2 will cause relay 46 to operate thus bringing back into operation the heating element 4E by reason of the closing of its contacts 55. Relay 46 will lock operated through its contacts 51. In this position of the selector switch, test circuit No. 3 is still in operation.

When the temperature in chamber 2 reaches the last and final upper limit of the entire predetermined temperature range, the selector switch will be advanced to position 8 whereupon selector switch bank A3 will place ground on the upper terminal of resistor 70 thereby causing relay 66 to release and throw test circuit No. 3 out of operation. It will also be noted that selector switch bank A4 will place ground on terminal 8 of that bank and consequently places ground, through contacts 71 of the selector switch, on the upper terminal of the selector switch coil. In the manner previously described, the selector switch is then caused to rapidly step around to position 44 whereupon the automatic advance of the selector switch is automatically stopped. At this positon, the brush of bank A5 causes the final relay to be operated through a circuit from battery through switch 33, through the final relay coil, through the brush of bank A5 and back to battery through ground. The operation of the final relay causes contacts 26 to open thereby deenergizing the coil of relay 29.

When relay 29 is released, its contacts 47 open thereby removing battery from all the coils of relays 43, 44, 45 and 46 so that any of these relays which were locked operated are now released. Also when relay 29 is deenergized, contacts 29' close, thus causing final lamp 37 to be illuminated to indicate the end of the test. The deenergization of relay 29 also causes motor 40 to stop by reason of the opening of contacts 30. In the event the motor 40 stops so that momentary contacts 12 remain closed, the power source 11 is removed from the bridge by reason of the opening of contacts 13 of relay 29. It may also be noted that relay 94 is energized through an obvious circuit while either of the brushes of banks A4 or A5 are on positions 8 to 43, inclusive. During this period contacts 95 are open so that power cannot be supplied to the bridge through contacts 12 and consequently relay BR cannot place ground on conductor 74. This prevents the undesired advance from position 44 should contacts 12 be closed when the brushes arrive at position 44 which would again energize the coil of the selector switch by reason of the operation of relays 14 and BR. It will thus be seen that all the electrical apparatus is restored to the original starting position ready for a new cycle of operations. It will also be noted that all of the test circuits are automatically controlled throughout the entire temperature run from the time the switch 33 is closed until the final lamp 37 is lit.

Figure 3:
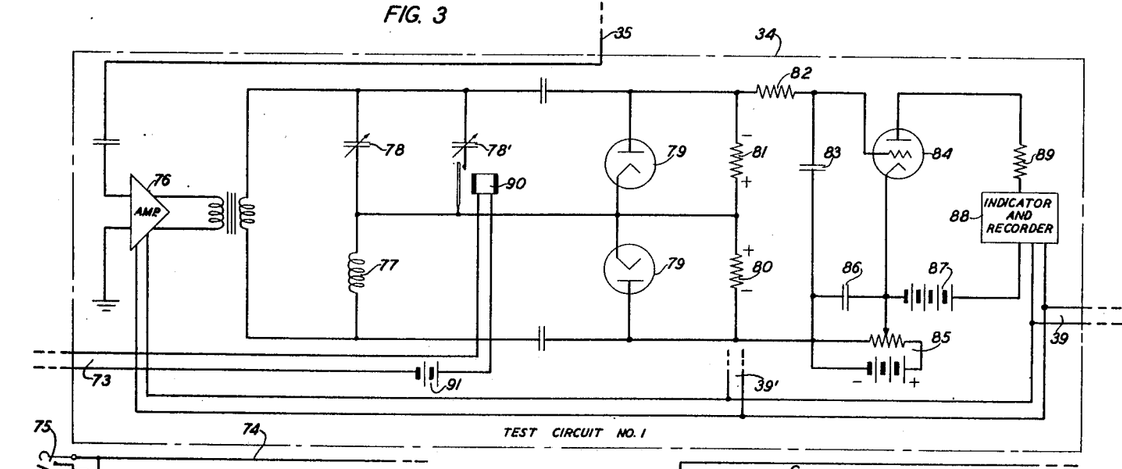
Fig. 3 discloses one form of test circuit which may be controlled by the apparatus of this invention.

As previously stated the test circuits Nos. 1, 2 and 3 of Fig. 2 may perform any one of a number of tests. For example, one of them may make a test for temperature and either indicate this temperature or make a permanent record thereof on a chart or both. Another one may test for frequency, for voltage, current or any other quantity which may be measured electrically. In Fig. 3 it is assumed that the test circuit No. 1 of Fig. 2 is for testing frequency. For this purpose it may be assumed that the apparatus under test 3 of Fig. 2 are piezoelectric crystals, such as for example, disclosed in Fig. 1 of the patent to Diehl et al. cited above. One of the circuits 35 from the apparatus under test 33 of Fig. 2 may come from a test oscillator associated with the piezoelectric crystal under test and this circuit 35 may enter the test circuit of Fig. 3 at the top as indicated. This circuit is connected to the input of an amplifier 76 through a condenser. When the relay 64 of Fig. 2 is energized, thus closing circuit 39, to start the test circuit No. 1 in operation, the circuit 39 of Fig. 3 is thereby closed, thus bringing into operation amplifier 76 and the indicator and recorder 88. The heaters for tubes 79 and 84 are not shown but they may be controlled by means of a circuit 39' in a manner well-known in the art.

This frequency test circuit operates in substantially the same principle as that disclosed in United States Patent 2,022,790 to W. W. Sturdy, issued December 3, 1935. For the purposes of this specification, the operation may be described as follows: The frequency to be measured is applied to the input circuit of amplifier 76 from circuit 35. The output of this amplifier is transformer coupled to a series connected network of inductance and capacity comprising inductor 77 and capacitor 78. Each of these elements, the inductor 77 and capacitor 78 is connected to a separate rectifier 79, the direct current output of which is applied to resistors 80 and 81, respectively. At resonant frequencies the alternating current voltages across the two elements 77 and 78 are equal so that the rectified output applied across their resistors 80 and 81 are equal and since they are connected in opposition, the direct current voltage across the extreme terminals of series-connected resistors 80 and 81 will be equal to zero. Should the frequency, however, either increase or decrease, the voltage across one of the elements 77 or 78 will become larger than the other so that the rectified output across resistors 80 and 81 will become unequal thereby causing a net direct current voltage difference to appear across the extreme terminals of resistors 80 and 81, which difference will be applied to charging condenser 83 through resistor 82. If a visual indication only is desired, a meter may be connected across this condenser 83 to observe the frequency deviation.

For automatic operation, however, it is preferred that some type of indicator or recorder be connected instead of the meter. For this purpose a direct current amplifier 84 is connected with its input circuit across the condenser 83. Normal bias is provided for the amplifier from an adjustable bias source 85 and a by-pass condenser 86 is connected across this bias source. Plate current supply is provided by the direct current source 87 schematically illustrated in Fig. 3 as a battery. The indicator and recorder 88 is shown in block form in Fig. 3 but may comprise any kind of conventional indicator or recorder well known in the art which indicator or recorder is capable of responding to a voltage or current variation. The indicator or recorder 88 is connected in the plate circuit of direct current amplifier 84 through a suitable resistor 89.

If an indication only is required in the event the frequency increases beyond some predetermined limit, a simple amplifier and relay circuit may be coupled to condenser 83, such as for example, the general type of relay circuit shown in United States Patent 1,445,731 to H. J. Van der Bijl, issued February 20, 1923.

As previously stated in connection with the description of Fig. 2, the closure of circuit 73 changes the test limits for test circuit No. 1. Referring to Fig. 3 it will be seen that the closure of circuit 73 closes the energizing coil circuit of relay 90 to direct current source 91. The operation of this relay 90 will bring into parallel with condenser 78 another condenser 78', thus changing the resonant frequency at which the voltages across resistors 80 and 81 will be equal. If the indicator 88 is a marginal relay which in turn operates some type of conventional signal or alarm, it is obvious that by the addition of condenser 78', the frequency limit is changed at which this marginal relay will be caused to operate. For example, assuming that the crystal under test has a nominal resonant frequency of 100 kilocycles, tuned circuit 77, 78 will be normally tuned to 100 kilocycles so that if the crystal is operating at the correct frequency, the voltage difference across resistors 80 and 81 will be zero. Assuming further that the indicator circuits including the direct current amplifier 84 are so adjusted that should the frequency of the crystal increase to 100.2 kilocycles, the marginal relay acting as the indicator 88 will be caused to operate. Now assuming that after some predetermined temperature limit has been reached, as for example, when the selector switch reaches position 3 as shown in Fig. 2, it is desired to change this test limit of 100.2 kilocycles. This is done at position 3 wherein the circuit 73 is closed so as to bring condenser 78' into parallel with condenser 78. Condenser 78' has been previously adjusted to such value that the resonant frequency of the network 77, 78, 78' is slightly lowered a predetermined amount. The resonant frequency of the crystal under test will now have to remain closer to the nominal 100 kilocycles in order to prevent the operation of the marginal relay 88 since a smaller increase in frequency will be required to produce a sufficient unbalance in the voltage output across resistors 80 and 81 to cause the relay to operate. This limit may be, for example, 100.1 kilocycles which is to say that the original limit of increase in frequency of 0.2 per cent has been reduced to one half that or 0.1 per cent.

Figure 4:
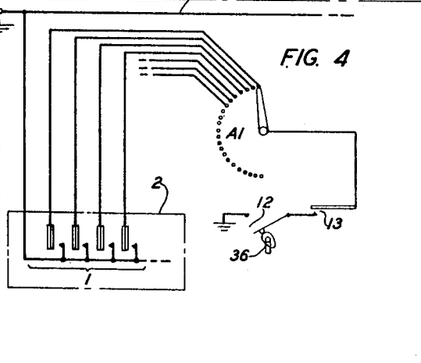
Figs. 4 and 5 disclose alternative forms of thermally responsive circuit control means which may be substituted for the ones shown in Figs. 1 and 2.

In Fig. 4 a different form of thermally responsive temperature control means is disclosed which may be substituted for the thermally responsive temperature control means 1 of Fig. 2. This thermally responsive circuit control means comprises a plurality of thermostats each adjusted to close a circuit at different temperatures. These thermostats are placed in the chamber 2 in place of the thermally responsive resistor 5 of Fig. 2 and perform the functions of this resistor 5 and the resistance bridge 1 together with its relays 14 and BR. It will be observed that as these thermostats close their circuits, ground may be placed on conductor 74 through an obvious circuit including the brush of selector switch bank A1, contact 13, of relay 29 (shown in Fig. 2), and momentary contact 12. It will be understood that these thermostats successively close their contacts beginning from left to right, as the temperature within the chamber 2 increases. Consequently the operation is substantially identical with that already described for Fig. 2 and it will be obvious that this portion of the circuit may be substituted for that bridge network together with its thermally responsive resistor 5. The operation otherwise remains identical. By reason of the fact that thermostats are used for the circuit control means 1, it is unnecessary to employ a direct current power source 11 as was necessary for the bridge in Fig. 2. It is only necessary that, in order to permit the selector switch to advance, the momentary contact 12 be employed just as in Fig. 2 and this momentary contact may be operated by the cam 36 in the same manner as described for Fig. 2.

Figure 5:
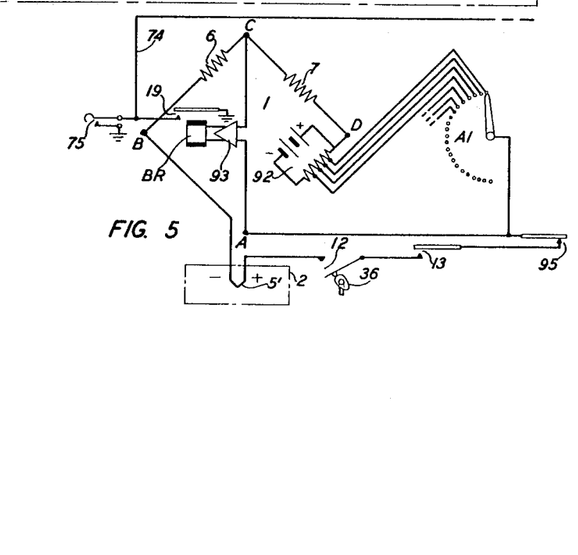

In Fig. 5, a bridge network of a type different from that shown in Fig. 2 is employed. Here the termally responsive element 5 is replaced by a thermocouple 5'. Then in the output of the bridge instead of employing the polarized relay 14 with bridge relay BR, a direct current amplifier 93 is connected, the output of which is connected to the bridge relay BR. Also in the AD arm of the bridge, the temperature range selector is provided in the form of a potentiometer 92. The operation of this circuit is as follows: When the temperature within chamber 2 reaches a predetermined limit, the voltage output of thermocouple 5' slightly exceeds the voltage drop in the portion of the resistor of potentiometer 92 which is connected in the AD arm of the bridge. The voltage which existed in this arm of the bridge is determined by the position of the selector switch bank A1 in substantially the same manner as the resistance was selected by the same switch bank in Fig. 2. When this voltage of thermocouple 5' exceeds the voltage drop in the AD arm, amplifier 93 causes the bridge relay BR to operate. This occurs, of course, upon the closure of contact 12 and the operation of the bridge relay BR places ground on conductor 74 in the same manner previously described for Fig. 2. Upon the subsequent opening of the momentary contact 12, the bridge relay BR is caused to deenergize and remove the ground from conductor 74. As previously described in connection with Fig. 2, this advances the selector switch so that bank A1 will select a new voltage limit determined by potentiometer circuit 92. Therefore, upon the reclosing of momentary contact 12, the voltage from thermocouple 5' is insufficient to overcome the new voltage inserted in the AD arm of the bridge so that the relay BR is not now operated and will not again operate until the temperature in chamber 2 increases sufficiently to cause the thermocouple 5' to again overcome the newly inserted voltage in the AD arm. The operation thereupon repeats in the same manner as previously described and the test advances just as described for Fig. 2.

While this invention has been specifically illustrated as starting its temperature range from some low temperature, it is obvious that the temperature range may start with a temperature well above ambient temperature and be lowered through a range extending well below ambient temperature. To accomplish this it is only necessary to preheat the contents of chamber 2 instead of precooling it and to substitute any well-known electrically-controlled refrigeration means for the heater 4. This will be recognized as an obvious equivalent means for controlling the rate of change of temperature through a predetermined temperature range.

What is claimed is:

1. A control system for automatically controlling test circuits throughout a predetermined temperature range of an object under test, comprising in combination test circuits to be controlled for testing said object, a thermally responsive circuit control means having at least one temperature sensitive element arranged to be placed in thermal proximity to said object so as to be operated in response to a first predetermined temperature thereof, said means including an electric current control device controlled by said temperature sensitive element, a switching means connected to said current control device to be operated thereby in response to the operation of said temperature sensitive element, a plurality of switch controlled circuits connected to and controlled by said switching means, an adjusting means in said thermally responsive circuit control means for adjusting a circuit element thereof to adjust the temperature at which said circuit control means responds, circuits connecting said adjusting means to one of said switch controlled circuits whereby upon operation of said switching means the temperature at which said circuit control means responds is changed from said first predetermined temperature to a second predetermined temperature, and other circuits including others of said switch controlled circuits connected to the test circuits whereby the operation thereof is controlled by the switching means and consequently in accordance with predetermined temperature limits of said object under test.

2. The combination of claim 1 wherein said thermally responsive circuit control means comprises an electric bridge in which the temperature sensitive element is a temperature sensitive resistor in one arm thereof, and said current control device comprises a polarized relay responsive to only one direction of unbalance of said bridge.

3. The combination of claim 1 wherein said thermally responsive circuit control means comprises an electric bridge in which the temperature sensitive element is a temperature sensitive resistor in one arm thereof, said current control device comprises a polarized relay responsive to only one direction of unbalance of said bridge, and said switching means comprises electromagnetic relay means with a plurality of contacts for circuit control.

4. The combination of claim 1 wherein said thermally responsive circuit control means comprises an electric bridge in which the temperature sensitive element is a temperature sensitive resistor in one arm thereof, said current control device comprises a polarized relay responsive to only one direction of unbalance of said bridge, and said switching means comprises an electromagnetically operated selector switch having a plurality of selector switch banks, one for each of said plurality of switch controlled circuits.

5. The combination of claim 1 wherein said thermally responsive circuit control means comprises an electric bridge in which said temperature sensitive element comprises one arm thereof so that the bridge may be unbalanced in a preselected direction by the response of said element to said first predetermined temperature, the bridge also including said adjusting means in one of its arms for changing the balance point of the bridge whereby the bridge may be adjusted to unbalance in the preselected direction at another predetermined temperature, and said current control device comprises a polarized relay responsive to only said preselected direction of unbalance of the bridge.

6. A control system for automatically controlling test circuits throughout a predetermined temperature range of an object under test, comprising in combination test circuits to be controlled for testing said object, a thermally responsive circuit control means having at least one temperature sensitive element arranged to be placed in thermal proximity to said object so as to be operated in response to a first predetermined temperature thereof, said means including an electric current control device controlled by said temperature sensitive element, a switching means connected to said current control device to be operated thereby in response to the operation of said temperature sensitive element, a plurality of switch controlled circuits connected to and controlled by said switching means, an adjusting means in said thermally responsive circuit control means for adjusting a circuit element thereof to adjust the temperature at which said circuit control means responds, circuits connecting said adjusting means to one of said switch control circuits whereby upon operation of said switching means the temperature at which said circuit control means responds is changed from said first predetermined temperature to a second predetermined temperature, other circuits including others of said switch control circuits connected to the test circuits whereby the operation thereof is controlled by the switching means and consequently in accordance with predetermined temperature limits of said object under test, an electric heater means arranged to be placed in heat transfer relation with said object for changing its temperature, a power source for supplying energy to said heater means, and circuits connecting said heater means to said power source, said circuits being included in at least one of said plurality of switch controlled circuits so that the heat supplied by said heater means is controlled by the operation of said switching means.

7. The combination of claim 6 wherein said thermally responsive circuit control means comprises an electric bridge in which the temperature sensitive element is a temperature sensitive resistor in one arm thereof, and said current control device comprises a polarized relay responsive to only one direction of unbalance of said bridge.

8. The combination of claim 6 wherein said thermally responsive circuit control means comprises an electric bridge in which the temperature sensitive element is a temperature sensitive resistor in one arm thereof, said current control device comprises a polarized relay responsive to only one direction of unbalance of said bridge, and said switching means comprises electromagnetic relay means with a plurality of contacts for circuit control.

9. The combination of claim 6 wherein said thermally responsive circuit control means comprises an electric bridge in which the temperature sensitive element is a temperature sensitive resistor in one arm thereof, said current control device comprises a polarized relay responsive to only one direction of unbalance of said bridge, and said switching means comprises an electromagnetically operated selector switch having a plurality of selector switch banks, one for each of said plurality of switch controlled circuits.

10. The combination of claim 6 wherein said switching means comprises an electromagnetically operated selector switch having a plurality of selector switch banks, one of said switch banks being connected in circuit with said adjusting means to adjust the temperature at which said circuit control means responds, a second bank being connected into said circuit connecting said heater means to the power source, and at least one other bank being connected to the said other circuits for controlling the starting, stopping or sensitivity of said test circuit.

11. The combination of claim 1 wherein said thermally responsive circuit control means comprises an electric bridge in which the temperature sensitive element is a thermoelectric generator.

GLENN L. PRUDHON.
RUSSELL W. SPIKULA.

REFERENCES CITED

The following references are of record in the file of this patent:

UNITED STATES PATENTS

| Number | Name | Date |
|---|---|---|
| 1,775,540 | Taylor | Sept. 9, 1930 |
| 1,831,151 | Walker | Nov. 10, 1931 |
| 2,058,846 | Waterman | Oct. 27, 1936 |
| 2,178,225 | Diehl et al. | Oct. 31, 1939 |
| 2,285,118 | Jones | June 2, 1942 |
| 2,300,537 | Davis | Nov. 3, 1942 |
| 2,340,837 | Meeker | Feb. 1, 1944 |